Aug. 4, 1970  R. F. WUERKER  3,522,979
COMBINATION OF HOLOGRAMS HAVING AN IMPROVED DIFFRACTED
IMAGE AND A METHOD FOR MAKING THE SAME
Filed Feb. 9, 1968
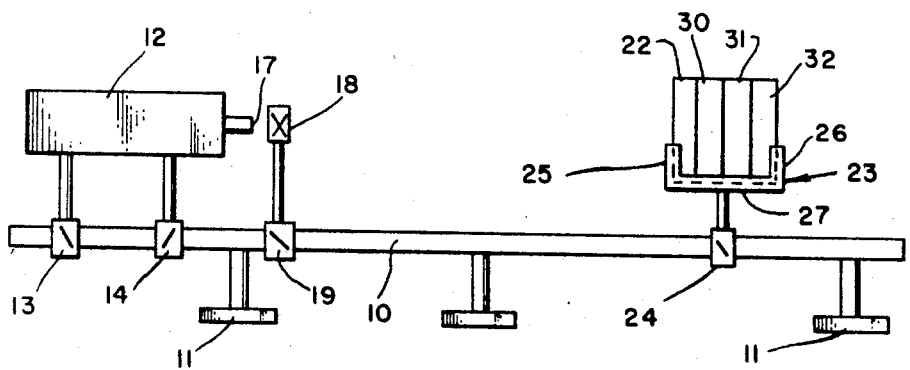
Ralph F. Wuerker
*INVENTOR.*
BY
ATTORNEY United States Patent Office 3,522,979
Patented Aug. 4, 1970

3,522,979
COMBINATION OF HOLOGRAMS HAVING AN IMPROVED DIFFRACTED IMAGE AND A METHOD FOR MAKING THE SAME
Ralph F. Wuerker, Palos Verdes Estates, Calif., assignor to TRW Inc., Redondo Beach, Calif., a corporation of Ohio
Filed Feb. 9, 1968, Ser. No. 704,347
Int. Cl. G02b 27/00
U.S. Cl. 350—3.5           6 Claims

ABSTRACT OF THE DISCLOSURE

The combination of holograms including an original hologram and second and third holograms secured together, and the second hologram being secured to the original hologram, the second hologram being a copy of the original and the third hologram being a copy of the original and the second holograms.

A method for making the combination of holograms as described in the preceding paragraph.

BACKGROUND OF THE INVENTION

Holography, or lens-less photography, is based upon the recording on a photographic film or plate of a diffraction pattern created by the interference between the coherent light scattered from an object or scene that has been illuminated with coherent light and light directly impinging upon the film from the same light source. The exposed film is then developed, and upon illumination with coherent light which duplicates the original reference beam (while positioned in the same geometric relation to the light as it was in being exposed) produces a diffracted beam which is a reconstruction of the original pattern scattered from the scene at the time of the exposure. The developed film or plates are holograms and are viewed when reconstructed as indicated. When so viewed, they are called virtual image holograms.

The reconstruction of the scene in a transmission hologram is a true virtual three-dimensional image whose perspective changes with the viewing angle. This virtual image can be examined and processed with conventional optical instruments, such as microscopes, telescopes and copy cameras, with the result that the virtual image can be examined at leisure in various focal planes.

Holograms recorded on high-resolution photographic plates, such as concentrated Lippman Emulsions (Eastman 649F), or Agfa Scientia 10E70, 10E75, diffract approximately 5% of the light of the reference beam into the order of the virtual image. Thus, holograms are not efficient users of the reconstructing light. For example, a high quality 4" x 5" hologram to be comfortably used requires a helium neon laser of approximately 20 milliwatts emission. Continuous wave laser illuminators are priced proportionally to the power of the emitted beam. Therefore, for reasons of economy, it is desirable to increase the amount of light energy cast into the virtual image of the hologram so as to lower the power requirements of the reconstructing source.

SUMMARY OF THE INVENTION

The invention is for a method, and combination of holograms resulting therefrom, for increasing the amount of light cast or diffracted into the order of the virtual image of a hologram.

An object of the invention is to provide a method for increasing the brightness of a holographic image as viewed in the reconstruction of the hologram.

Another object of the invention is to provide a combination of an original hologram with copies thereof in which, when reconstructed, the brightness of the holographic image is increased substantially over that which would be produced in the reconstruction of the original hologram alone.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWING

Referring to the accompanying drawing, which is for illustrative purposes:

The single figure is an elevational view illustrating apparatus, according to the invention, used for increasing the brightness of a holographic image of an original hologram.

BRIEF DESCRIPTION OF THE PREFERRED EMBODIMENT

In the drawing there is shown a track or rod 10 supported by three pedestals 11 which in turn are adapted to be supported on a table. On one end of the track there is shown a laser 12 adjustably supported by clamps 13 and 14. The laser may be, for example, a helium neon gas laser or a pulsed ruby laser. The laser beam is emitted through an opening 17 in the laser frame. Directly in front of the opening 17 is a photographic-type shutter 18 adjustably supported on the track by a clamping means 19.

Spaced from the laser and shutter is an original or master hologram 22 supported in a holder 23, adjustably secured to the track by a supporting means 24. The holder 23 has an open front and rear and has two side tracks 25 and 26 on each side and a base track 27 into which three hologram plates, such as 22, may be fitted. Secured to the original hologram 22 by means of a transparent epoxy cement or the equivalent, is a second copied hologram 30 and secured to the latter by the same means is a photographic plate 31 adapted to be made into a hologram copied from the first and second holograms.

To carry out the method, according to the invention, the original hologram 22 is made in the usual manner. Then, an unexposed high resolution photographic plate, such as Eastman 649F, is cemented to the developed hologram 22 with the emulsion side of the plate facing away from the hologram. The hologram and plate are then positioned in a holder such as 23, with the hologram 22 facing the laser and the emulsion side of the plate facing away from the laser. The plate is then ready to be made into a duplicate of the hologram. To do this, the original laser beam used to make the hologram 22 is duplicated as closely as possible; that is, the hologram 22 is positioned the same geometrically with respect to the reference beam from the laser that it was when it was exposed as a photographic plate to make the hologram. Further, the hologram when the angle between the hologram and the original laser beam is no longer exactly known, 22, may be adjusted so as to maximize the amount of diffracted light or light in the virtual holographic image which will be reconstructed when the light from the laser is cast upon it. This adjustment is made, before the shutter is supported on the track and before the photographic plate is secured to the hologram, by tilting the hologram with respect to the laser beam so that it is in a position of maximum brightness when viewed as reconstructed. The hologram with the plate secured to it is then placed in the same adjusted position with respect to the laser in the holder 23.

To then expose the plate to copy the hologram, the shutter is opened, typically for five seconds for a 20-milliwatt laser emission, and the plate receives both the transmitted and diffracted beams from the hologram. The diffracted beam is the virtual image which is to be duplicated and the transmitted beam serves as the reference beam. If a gas laser is used, the beam is continuous and the shutter is merely opened for a maximum desired period to give the proper exposure. If a pulsed ruby laser is used, the shutter can be held open and the pulsed laser can be allowed to emit a sufficient number of pulses of radiant energy to expose the plate the proper amount. The exposure of the plate may be a millisecond or may be several millisecond pulses from a ruby laser illuminator.

After the plate has been exposed, it is, remaining attached to the hologram, developed in the usual manner, namely, by placing it for five minutes in Kodak HRP Developer, rinsing in tap water and placing it for three minutes in hypo. After processing the plate, it may be bleached, for example, with Quicktone (a product of Henry P. Korn Associated, Inc.), or as described in Agfa Gevaert, "Technical Information Scientific Photography, Holography," October 1967, or with a dilute aqueous solution of potassium ferricyanide, so as to compensate for variations in the intensity of the original virtual image as well as for variations in the transmission of light through the hologram. It may also be toned as needed to further improve the virtual image when reconstructed. At this stage of the process, the first hologram 22 has attached to it a second hologram 30 as shown in FIG. 1, the hologram 30 having been previously the plate referred to in the foregoing.

A third unexposed high resolution plate 31 is then cemented to the second hologram 30 in the same manner as the latter, when an unexposed plate, was secured to the hologram 22. The unexposed plate 31 has its emulsion side facing away from the laser.

To make a copy of the holograms 22 and 30 in the plate 31, the hologram 22 positioned in the holder 23 in the same way it was when the plate from which the hologram 30 was made, was exposed by the light from the laser. After the plate 31 is exposed, developed, bleached and toned, it then is a third hologram and it is a copy of the original and first copy, or second hologram 30.

A fourth unexposed high resolution plate 32 is cemented to developed plate 31 and the process is repeated to make it a fourth hologram and a copy of the original, and the copies 30 and 31.

By sequentially adding hologram copies to an original, the amount of light diffracted is increased on reconstruction and further, by this method, the hologram plates are properly set for the modification of the reconstructing beam as it passes through the subsequent plates. In this manner, a composite of an original hologram and copies can be built up so that the combination diffracts better than one-third of the original beam into the order of the virtual image. Approximately three or four such plates will make this possible.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific forms shown or uses mentioned, except as defined by the accompanying claims, wherein various portions have been separated for clarity of reading and not for emphasis.

I claim:
1. A method for increasing the brightness of a holographic image, comprising:
 (a) securing a hologram and a first unexposed photographic plate together in parallel relationship so that light passing through said hologram will expose said plate
 (b) the unexposed emulsion on the first plate facing away from the hologram;
 (c) positioning a laser so that its beam will be cast upon the hologram to substantially duplicate the original reference beam which produced the hologram;
 (d) casting the beam from said laser on said hologram so as to expose said plate;
 (e) developing the exposed first plate;
 (f) securing a second unexposed photographic plate on said first plate in parallel relationship so that light passing through said hologram and said first plate will expose said second plate,
 (g) the unexposed emulsion on the second plate facing away from said first plate;
 (h) positioning said laser so that its beam will be cast upon the hologram to substantially duplicate the original reference beam;
 (i) casting the beam from said laser on said hologram and said first plate so as to expose said second plate; and
 (j) developing the second plate.

2. The method according to claim 1 in which:
 said holograms and plates are secured together in a face-to-face relationship with a transparent cement.

3. The method according to claim 1 including:
 bleaching each plate after it is developed to compensate for variations in the intensity of the virtual image of the hologram produced during exposure of the plate, and for variations in the transmission of the hologram.

4. Apparatus for increasing the brightness of a holographic image, comprising:
 (a) a laser;
 (b) a hologram positioned with respect to the laser so that the laser beam will be cast upon the hologram to substantially duplicate the original reference beam which produced the hologram;
 (c) a second hologram secured to said first hologram,
 (d) the emulsion side of said second hologram facing away from said first hologram and the other side of said hologram being in substantial effective contact with said first hologram,
 (e) said second hologram being a copy of said first hologram and having been made while secured to said first hologram;
 (f) an unexposed photographic plate secured to said second hologram so that said laser beam will pass through said first and second holograms and expose said plate,
 (g) the emulsion side of said plate facing away from said second hologram and the other side of said plate being in substantial effective contact with said second hologram; and
 (h) said laser having means associated therewith to limit the time of exposure of said plate.

5. A combination of holograms having an improved diffracted image in reconstruction, comprising:
 (a) an original hologram of a scene;
 (b) a second and third hologram secured together and said second hologram being secured to said original hologram,
 (c) said holograms being in face-to-face relationship,
 (d) said second hologram being a copy of said original hologram and said third hologram being a copy of said original and said second holograms,
 (e) said second hologram having been made while its unexposed photographic plate was secured to said original hologram and said third hologram having been made while its unexposed photographic plate was secured to said second hologram and said second hologram was secured to the original hologram, (f) the copies having been made with a laser beam that was a substantial duplicate of the beam that made the original hologram, the original having been in substantially the same position with respect to the beam when the copies were made that it was when it was made.

6. The invention according to claim 5 in which:
said holograms are secured together by means of a transparent cement.

References Cited

Sherman, Applied Optics, vol. 6, No. 10, October 1967, pp. 1749–53.

DAVID SCHONBERG, Primary Examiner

R. J. STERN, Assistant Examiner

U.S. Cl. X.R.

355—2